(12) United States Patent
Takachi

(10) Patent No.: US 6,470,767 B2
(45) Date of Patent: Oct. 29, 2002

(54) CABLE CONNECTING APPARATUS FOR BICYCLE COMPONENT

(75) Inventor: Takeshi Takachi, Sommerville Park (SG)

(73) Assignee: Shimano (Singapore) Private, Ltd., Singapore (SG)

( * ) Notice: Subject to any disclaimer, the term of this patent is extended or adjusted under 35 U.S.C. 154(b) by 0 days.

(21) Appl. No.: 09/992,177

(22) Filed: Nov. 14, 2001

(65) Prior Publication Data

US 2002/0033066 A1 Mar. 21, 2002

Related U.S. Application Data

(62) Division of application No. 09/322,066, filed on May 27, 1999, now Pat. No. 6,341,538.

(51) Int. Cl.⁷ .......................... F16C 1/10; F16H 63/04; F16B 39/34
(52) U.S. Cl. ................ 74/502.6; 74/502.4; 474/82; 474/79; 474/80; 411/302; 188/24.21
(58) Field of Search ............... 474/80, 82, 79, 474/70, 69; 74/502.4, 502.3, 502.6, 502.5, 489, 527, 501.5 R; 188/24.21, 24.22, 24.19, 24.24, 24.12; 280/238, 261; 411/929, 118, 257, 301, 302

(56) References Cited

U.S. PATENT DOCUMENTS

| | | | |
|---|---|---|---|
| 3,552,467 A | 1/1971 | Bergere | 151/14 |
| 3,568,746 A | 3/1971 | Faroni | 151/7 |
| 3,639,893 A | 2/1972 | Kunkle et al. | 339/184 M |
| 3,818,525 A | 6/1974 | Bedi | 10/27 R |
| 4,486,182 A | 12/1984 | Coué | 474/80 |
| 4,823,752 A | 4/1989 | Uuskallio | 123/400 |
| 4,832,662 A | 5/1989 | Nagano | |
| 5,104,358 A | 4/1992 | Kobayashi | 474/82 |
| 5,431,255 A | 7/1995 | Tsuchie | 188/24.16 |
| 5,501,302 A | 3/1996 | Hung | 188/24.21 |
| 5,505,105 A | 4/1996 | Kuo | 74/502.4 |
| 5,560,260 A | 10/1996 | Kuo | 74/502.4 |
| 5,582,272 A | 12/1996 | Chen | 188/24.21 |
| 5,620,384 A | 4/1997 | Kojima et al. | 474/82 |
| 5,865,698 A | 2/1999 | Huang et al. | 474/82 |
| 6,234,927 B1 | 5/2001 | Peng | |
| 6,341,538 B1 * | 1/2002 | Takachi | 74/502.6 |

FOREIGN PATENT DOCUMENTS

| | | |
|---|---|---|
| EP | 584371 A1 | 3/1994 |
| GB | 2145173 A | 3/1985 |

* cited by examiner

*Primary Examiner*—Thomas R. Hannon
*Assistant Examiner*—Marcus Charles
(74) *Attorney, Agent, or Firm*—James A. Deland

(57) ABSTRACT

A cable connecting mechanism for a bicycle component includes a cable connecting unit having a fastener opening and a fastener disposed in the fastener opening. The fastener includes a head and a shank including a locking portion disposed in the fastener opening and a threaded portion disposed between the head and the locking portion so that a space for receiving a cable therein is formed between the locking portion and the head. A locking member is disposed at the locking portion of the fastener for locking the faster to the cable connecting unit.

15 Claims, 8 Drawing Sheets

CABLE CONNECTING APPARATUS FOR BICYCLE COMPONENT

CROSS REFERENCE TO RELATED APPLICATIONS

This application is a division of copending application no. 09/322,066, filed May 27, 1999, now U.S. Pat. No. 6,341,538 B1.

BACKGROUND OF THE INVENTION

The present invention is directed to cable-controlled devices for bicycles and, more particularly, to an apparatus for connecting a cable to such a device.

Many bicycle control devices such as derailleurs, brakes, etc. are operated by Bowden-type control cables wherein an inner wire slides within an outer casing. The inner wire is connected to an actuating arm or some other structure of the control device such that pulling and releasing the inner wire causes the control device to move in a desired manner. During assembly of the bicycle, the inner wire ordinarily is securely fixed between a bolt and nut that are coupled to the control device.

When the control device is shipped to the bicycle assembler, the bolt and nut used to connect the inner wire to the control device usually is tightened on the control device so that the bolt and nut will not loosen and become separated from the control device during shipping. When the bolt and nut are separated from the control device, the chances are very great that the bolt and nut will become lost, thus causing much delay while a suitable replacement is located and installed. Unfortunately, when the bolt and nut are tightened to prevent such loss, the bolt and nut must be loosened during assembly so that the inner wire can be placed in the proper position, and then the bolt and nut must be retightened to affix the inner wire to the control device. The loosening step creates extra steps for the assembly process and significantly slows down the assembly line.

SUMMARY OF THE INVENTION

The present invention is directed to a cable connecting apparatus for a bicycle component wherein a nut and bolt used to fix a cable to a bicycle component are securely fixed together to avoid loosening during shipping, but the nut and bolt do not need to be loosened when the cable is affixed to the component. In one embodiment of the present invention, a cable connecting mechanism for a bicycle component includes a cable connecting unit having a fastener opening and a fastener disposed in the fastener opening. The fastener includes a head and a shank including a locking portion disposed in the fastener opening and a threaded portion disposed between the head and the locking portion so that a space for receiving a cable therein is formed between the locking portion and the head. A locking member (e.g., an adhesive) is disposed at the locking portion of the fastener for locking the faster to the cable connecting unit.

In a more specific embodiment, the fastener opening has a threaded inner peripheral surface, and the locking member is disposed between the locking portion of the fastener and the threaded inner peripheral surface. In an even more specific embodiment, the cable connecting unit includes a cable connecting member and a nut disposed at a first side of the cable connecting member, wherein the nut forms the fastener opening. If desired, the head may be disposed at a second side of the cable connecting member, wherein the second side is opposite the first side, and the space is disposed at the second side of the cable connecting member. In this case, the cable is sandwiched between the fastener head and the cable connecting member. Alternatively, the space may be disposed at the first side of the cable connecting member so that the cable may be sandwiched between the nut and the cable connecting member. To facilitate assembly, the fastener may include a rotation inhibiting fastener portion having a rotation inhibiting shape, and the cable connecting member may include a rotation inhibiting engaging portion engaging with the rotation inhibiting fastener portion so that the fastener remains rotationally stationary during assembly. In other words, only the nut needs to be turned to clamp the cable to the nut and bolt.

DETAILED DESCRIPTION OF THE EMBODIMENTS

Figure 1:
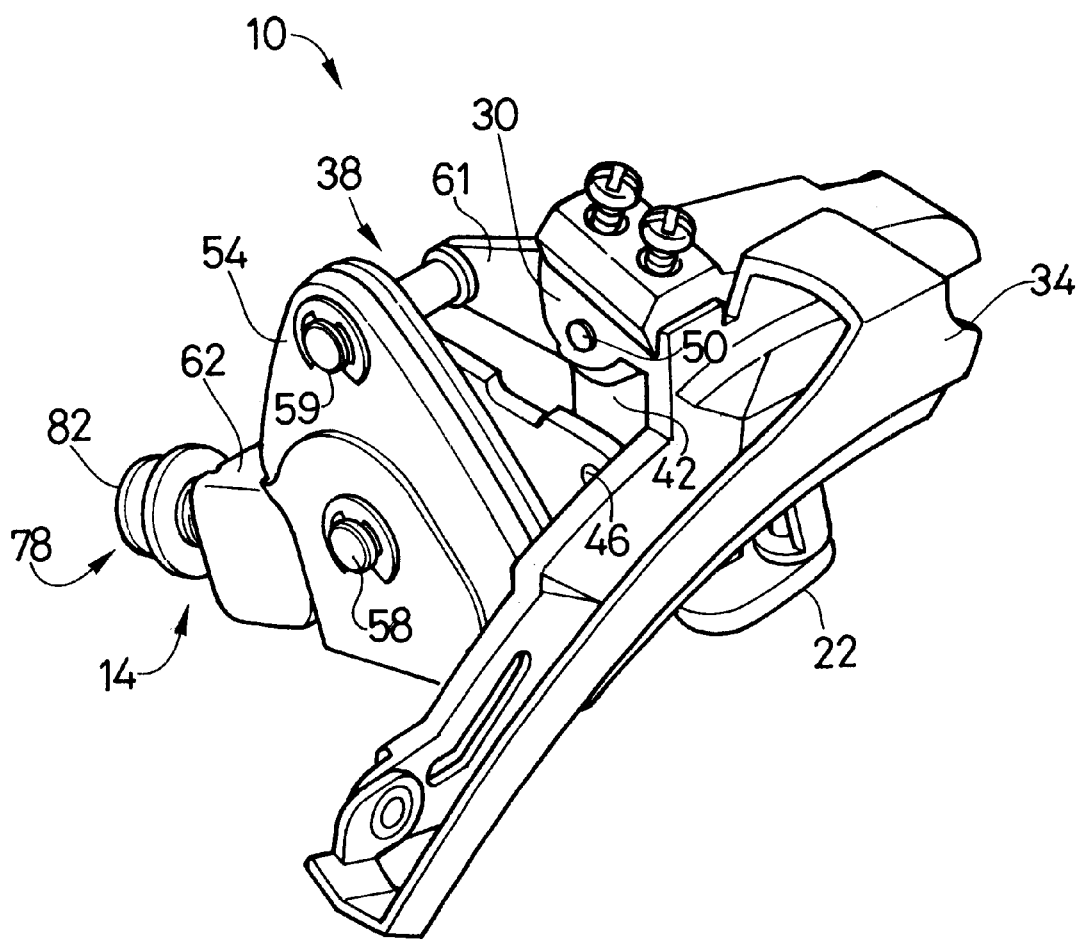
FIG. 1 is an oblique view of a front derailleur that includes a particular embodiment f a cable connecting apparatus according to the present invention.
Figure 2:
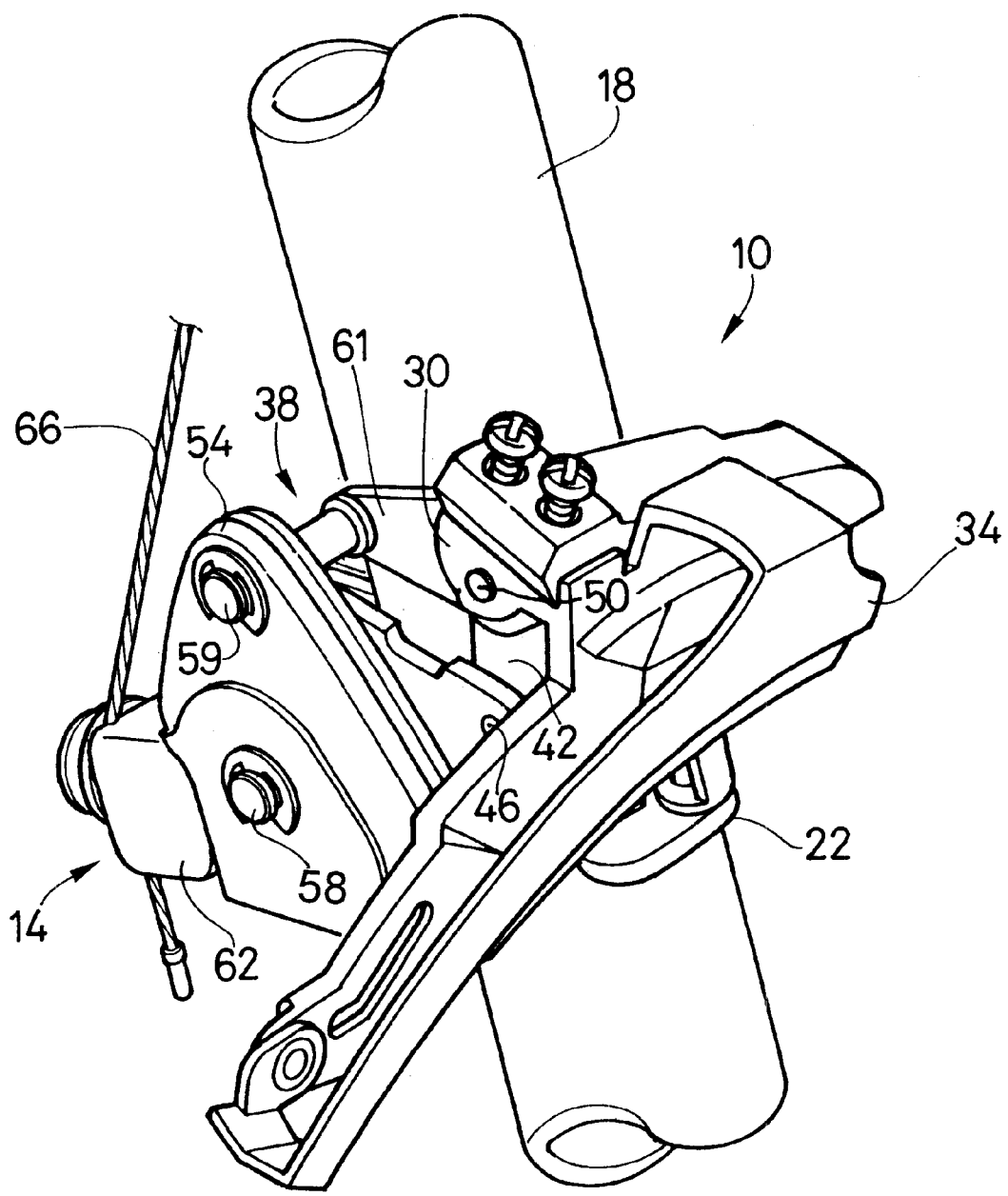
FIG. 2 is an oblique view of the derailleur shown in FIG. 1 in an assembled state.
Figure 3:
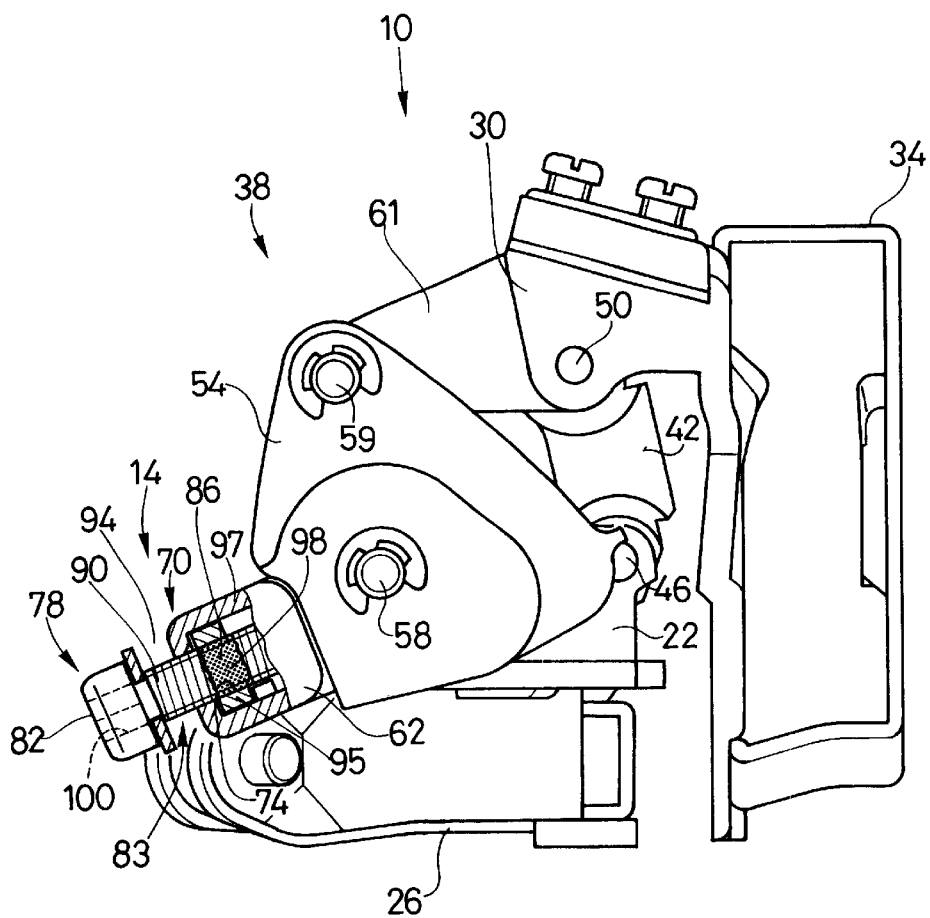
FIG. 3 is a partial cross sectional view of the derailleur shown in FIG. 1 illustrating the cable connecting apparatus.

FIG. 1 is an oblique view of a front derailleur 10 that includes a particular embodiment of a cable connecting apparatus 14 according to the present invention, and FIG. 2 is an oblique view of derailleur 10 assembled to a bicycle frame tube 18. Derailleur 10 includes a base member 22 having a clamp band 26 (FIG. 3) for attaching derailleur 10 the bicycle frame tube 18 in a well-known manner; a movable member 30 supporting a chain guide 34, and a linkage mechanism 38 coupled between base member 22 and movable member 30 so that movable member 30 can move laterally relative to bicycle frame tube 18. As shown in FIGS. 1–3, linkage mechanism 38 includes a link 42 pivotably connected to base member 22 through a pivot pin 46 and pivotably connected to movable member 30 through a pivot pin 50; a link 54 pivotably connected to base member 22 through a pivot pin 58, and a link 61 pivotably connected to link 54 through pivot pin 59 and pivotably connected to link 42 and movable member 30 through pivot pin 50. A cable connecting member in the form of an actuating arm 62 is integrally attached to link 54 so that movement of actuating arm 62 clockwise in FIGS. 1 and 2 causes chain guide 34 to move laterally outwardly from bicycle frame tube 18, and movement of actuating arm 62 counterclockwise causes chain guide 34 to move laterally inwardly towards bicycle frame tube 18. Movement of actuating arm 62, and hence chain guide 34, is controlled by a cable 66 affixed to actuating arm 62 in a manner described below. The general structure and operation of derailleur 10, except for the cable connecting apparatus 14, is well known, so a further detailed description of these conventional aspects of derailleur 10 will be omitted.

Figure 4:
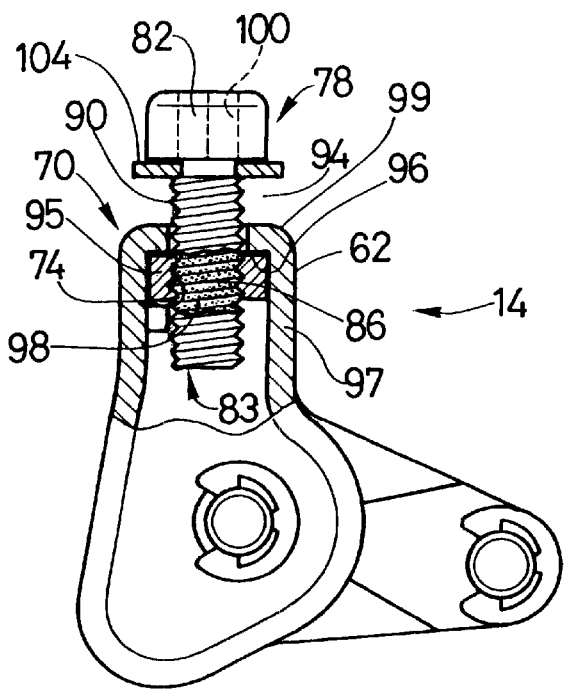
FIG. 4 is a partial cross sectional view of the actuating arm of the derailleur shown in FIG. 1 illustrating the cable connecting apparatus.

FIGS. 1 and 3 show derailleur 10 in a state suitable for shipment, and FIG. 4 is a detailed partial cross sectional view of cable connecting apparatus 14 in this state. As shown more particularly in FIGS. 3 and 4, cable connecting apparatus 14 includes a cable connecting unit 70 having a fastener opening 74, and a fastener in the form of a bolt 78 disposed in fastener opening 74. Bolt 78 includes a head 82 and a shank 83 including a locking portion 86 disposed in fastener opening 74 and an exposed threaded portion 90 disposed between head 82 and locking portion 86 so that a space 94 is formed between locking portion 86 and head 82. In this embodiment, head 82 has a circular shape with a hexagonal tool engaging hole 100, but head 82 could have any other shape (e.g., hexagonal) which allows head 82 to be engaged by a tool.

Cable connecting unit 70 includes actuating arm 62 and a nut 95 disposed directly adjacent to a first side 96 of actuating arm 62, wherein nut 95 has a threaded inner peripheral surface which forms fastener opening 74 and mates with threaded portion 90 of bolt 78. Actuating arm 62 forms a nut housing 97, wherein nut 95 is nonrotatably disposed in nut housing 97. This may be accomplished by using an adhesive between nut 95 and the first side 96 of actuating arm 62, buy welding nut 95 to actuating arm 62, by forming nut 95 as a hexagon wherein opposite sides of nut 95 contact opposite walls of nut housing 97, or by some other method. As a result, head 82 and space 94 are disposed at an opposite second side 99 of actuating arm 62.

A locking member 98 is disposed at locking portion 86 of bolt 78 between the threaded fastener opening 74 and locking portion 86 for locking bolt 78 to nut 95 and hence to cable connecting unit 70. Locking member 98 may be an adhesive such as DRYLOCK (tm) or any other structure which prevents bolt 78 from loosening from cable connecting unit 70 during shipping but which allows bolt 78 to turn during assembly.

Figure 5:
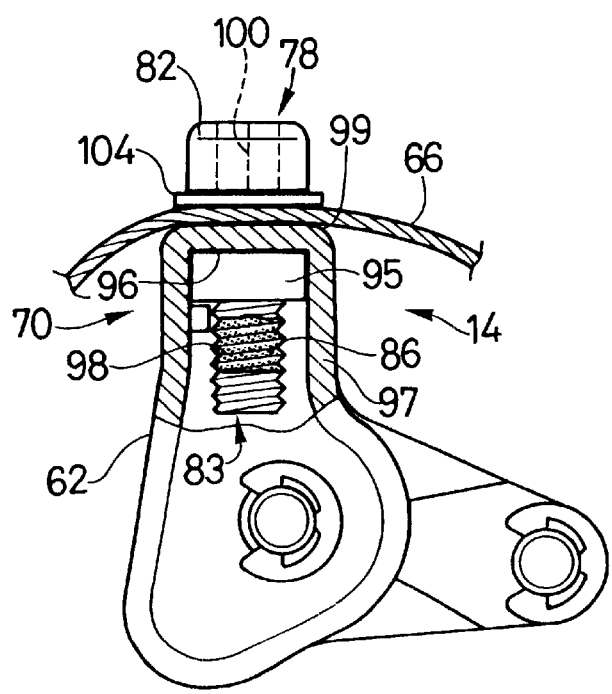
FIG. 5 is a partial cross sectional view of the actuating arm of the derailleur shown in FIG. 1 illustrating the cable connecting apparatus in an assembled state.

When cable 66 is to be affixed to cable connecting apparatus 14, cable 66 is placed in space 94, a tool is engaged with tool engaging hole 100, and bolt 78 is rotated to cause head 82 to move toward the second side 99 of actuating arm 62. In this embodiment, a washer 104 is disposed around bolt 78 between locking portion 86 and head 82 for pressing against cable 66 as shown in FIG. 5.

Figure 6:
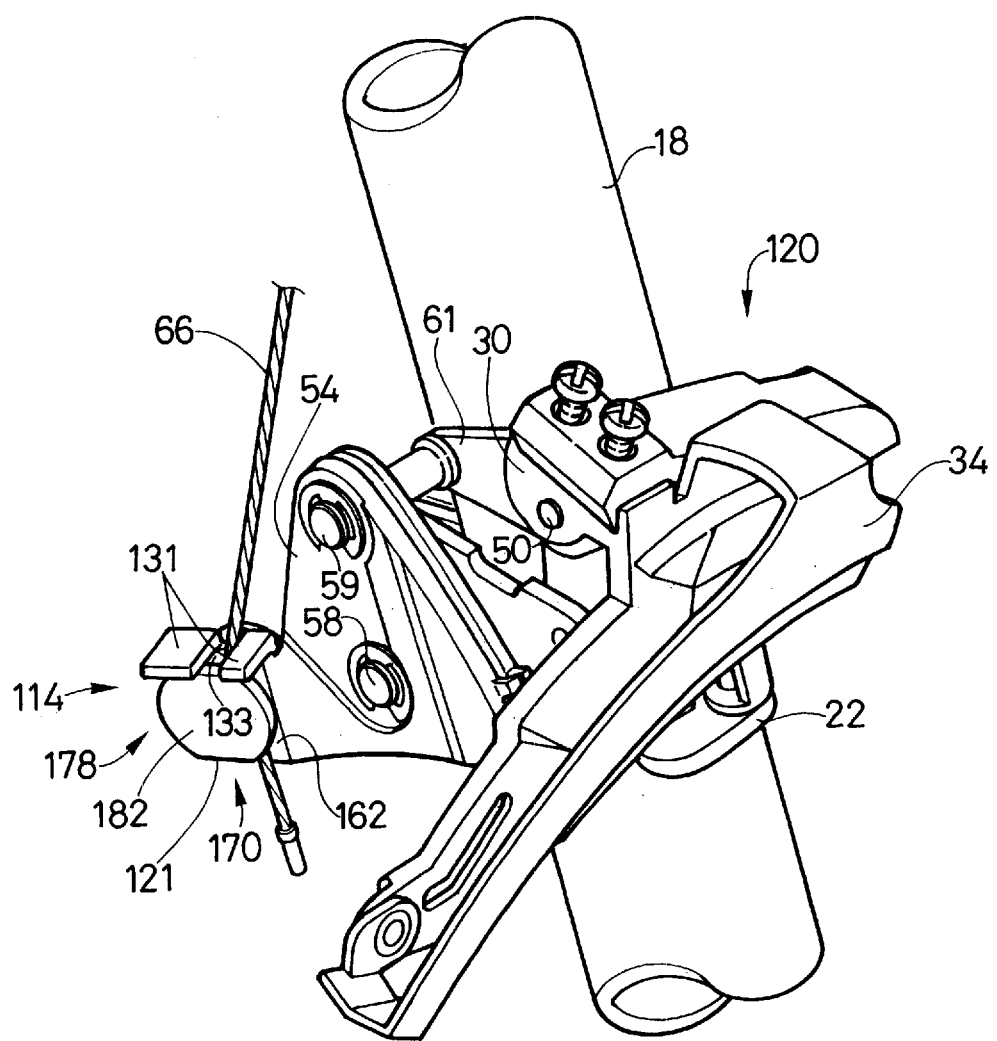
FIG. 6 is an oblique view of a front derailleur that includes an alternative embodiment of a cable connecting apparatus according to the present invention.
Figure 7:
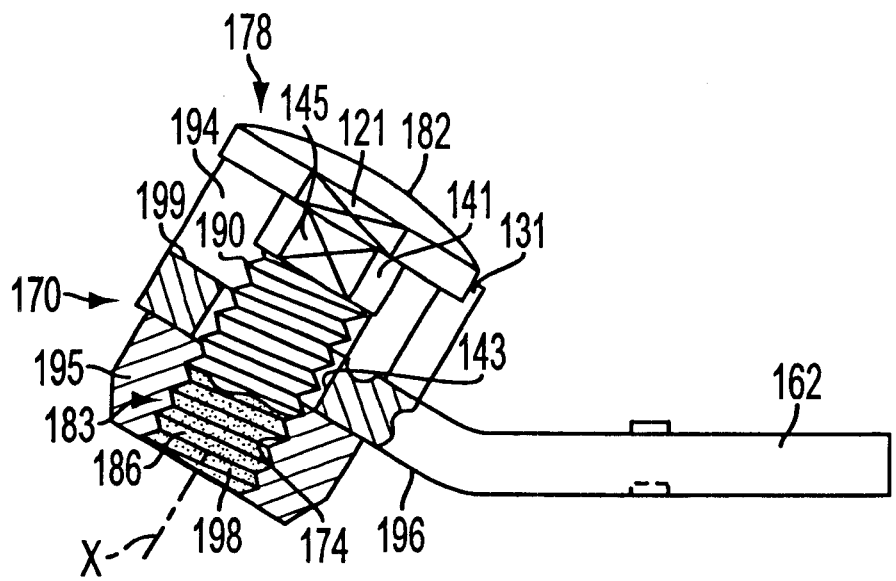
FIG. 7 is a partial cross sectional view of the actuating arm of the derailleur shown in FIG. 6 illustrating the cable connecting apparatus.

FIG. 6 is an oblique view of a front derailleur 120 that includes an alternative embodiment of a cable connecting apparatus according to the present invention. This embodiment is the same as the first embodiment shown in FIG. 1 except for an alternative embodiment of a cable connecting apparatus 114, so the identical components are numbered the same as in the first embodiment. FIG. 7 is a partial cross sectional view of the cable connecting apparatus 114, and FIG. 8 is a partial cross sectional view of the cable connecting apparatus 114 in an assembled state.

Figure 8:
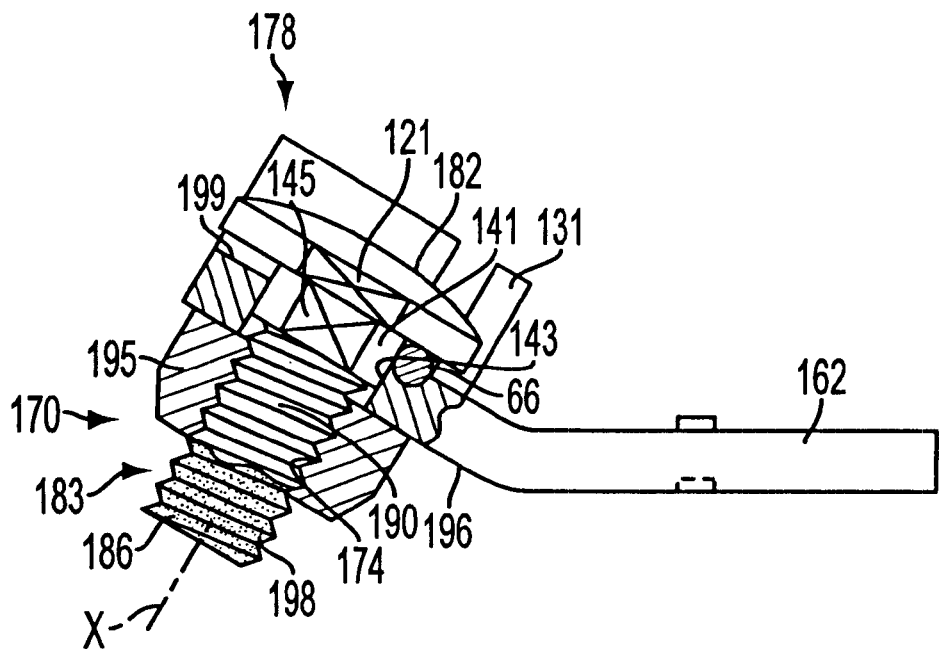
FIG. 8 is a partial cross sectional view of the actuating arm of the derailleur shown in FIG. 6 illustrating the cable connecting apparatus in an assembled state.

As shown in FIGS. 6–8, cable connecting apparatus 114 includes a cable connecting unit 170 having a fastener opening 174, and a fastener in the form of a bolt 178 disposed in fastener opening 174. Bolt 178 includes a head 182 and a shank 183 including a locking portion 186 disposed in fastener opening 174 and an exposed threaded portion 190 disposed between head 182 and locking portion 186 so that a space 194 is formed between locking portion 186 and head 182. In this embodiment, cable connecting unit 170 includes an actuating arm 162 and a nut 195 disposed directly adjacent to a first side 196 of actuating arm 162, wherein nut 195 has a threaded inner peripheral surface which forms fastener opening 174 and mates with threaded portion 190 of bolt 178. As a result, head 182 and space 194 are disposed at an opposite second side 199 of actuating arm 162. As with the first embodiment, a locking member 198 is disposed at locking portion 186 of bolt 178 between the threaded fastener opening 174 and locking portion 186 for locking bolt 178 to nut 195 and hence to cable connecting unit 170.

In this embodiment, head 182 of bolt 178 includes a rotation inhibiting fastener portion 121, and actuating arm 162 includes a rotation inhibiting engaging portion in the form of tabs 131 that project from second surface 199 and engage with the rotation inhibiting fastener portion 121. Tabs 131 define a slot 133 for receiving cable 66 therethrough. In general, rotation inhibiting fastener portion 121 has a rotation inhibiting shape when viewed along a longitudinal axis X of bolt 178. In this embodiment, rotation inhibiting fastener portion 121 has a flat shape. Also, bolt 178 includes a collar 141 disposed on shank 183 between locking portion 186 and head 182 (e.g., directly adjacent head 182). Collar 141 includes a flat rotation inhibiting portion 145 which engages with a flat portion of a collar opening 143 to enhance stability of the assembled structure.

When cable 66 is to be affixed to cable connecting apparatus 114, cable 66 is placed in space 194, and a tool is engaged with nut 195. Nut 195 is rotated with the tool to cause head 182 to move toward the second side 199 of actuating arm 162 without rotating bolt 178 as a result of the engagement between rotation inhibiting fastener portion 121 on head 182 and tabs 131 extending from actuating arm 162. In the assembles state, head 182 presses against cable 66 as shown in FIG. 8.

Figure 9:
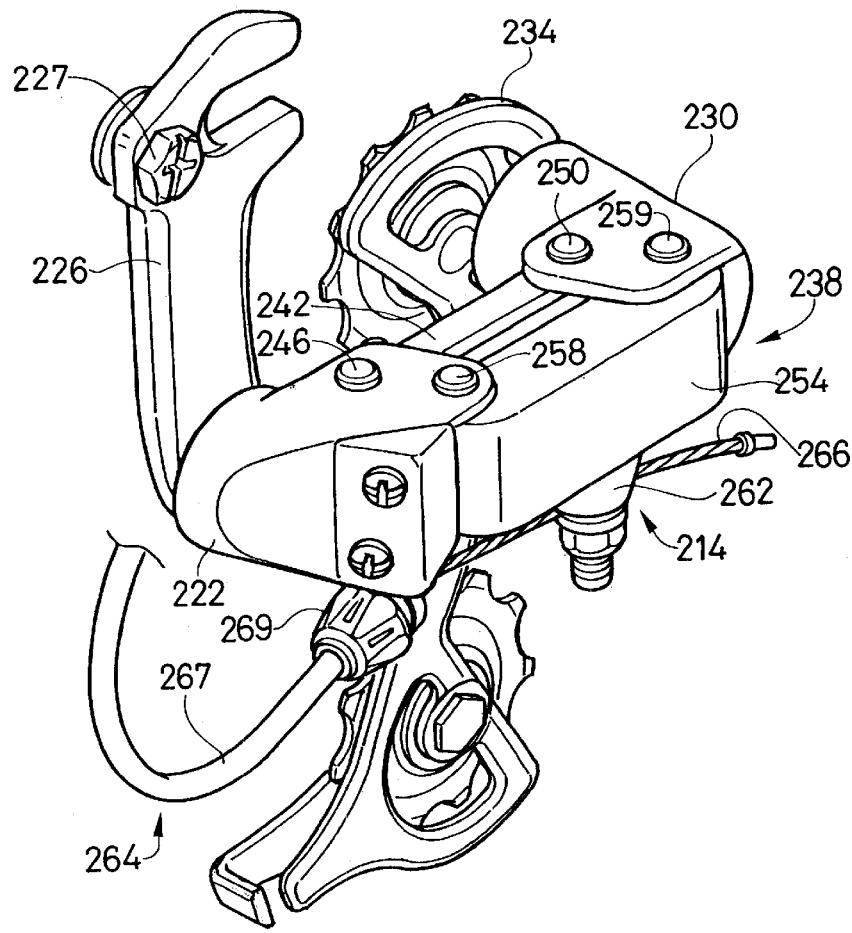
FIG. 9 is an oblique view of a rear derailleur that includes a particular embodiment of a cable connecting apparatus according to the present invention.

FIG. 9 is an oblique view of a rear derailleur 210 that includes a particular embodiment of a cable connecting apparatus 214 according to the present invention. Derailleur 210 includes a base member 222 connected to a fixing member 226 for attaching derailleur 210 to the rear of the bicycle frame (not shown) through a fixing bolt 227 in a well-known manner; a movable member 230 supporting a chain guide 234, and a linkage mechanism 238 coupled between base member 222 and movable member 230 so that movable member 230 can move laterally in a well known manner.

Linkage mechanism 238 includes a link 242 and a link 254. Link 242 is pivotably connected to base member 222 through a pivot pin 246 and pivotably connected to movable member 230 through a pivot pin 250. Similarly, link 254 is pivotably connected to base member 222 through a pivot pin 258 and pivotably connected to movable member 230 through a pivot pin 259.

A cable connecting member in the form of an actuating arm 262 is integrally attached to link 254 so that movement of actuating arm 262 clockwise around pivot pin 258 causes chain guide 234 to move to the right in FIG. 9, and movement of actuating arm 262 counterclockwise around pivot pin 258 causes chain guide 234 to move to the left. Movement of actuating arm 262, and hence chain guide 234, is controlled by a Bowden-type control cable 264 having an inner cable 266 that slides within an outer casing 267. Outer casing 267 is stopped at base member 222 through a tension adjusting barrel 269 in a known manner and inner cable 266 is affixed to actuating arm 262 in a manner described below. The general structure and operation of derailleur 210, except for the cable connecting apparatus 214, is well known, so a further detailed description of these conventional aspects of derailleur 210 will be omitted.

Figure 10:
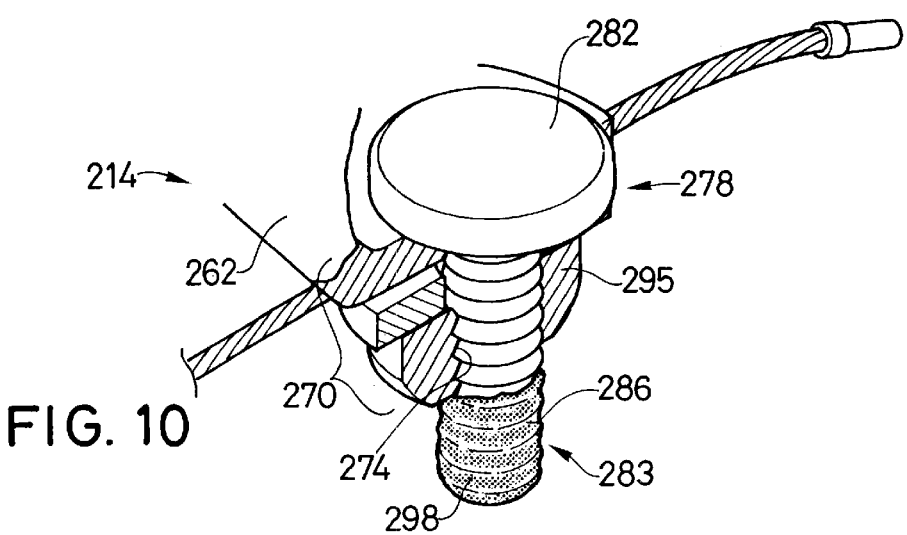
FIG. 10 is an oblique partial cross sectional and cut away view of the actuating arm of the derailleur shown in FIG. 9 illustrating the cable connecting apparatus.
Figure 11:
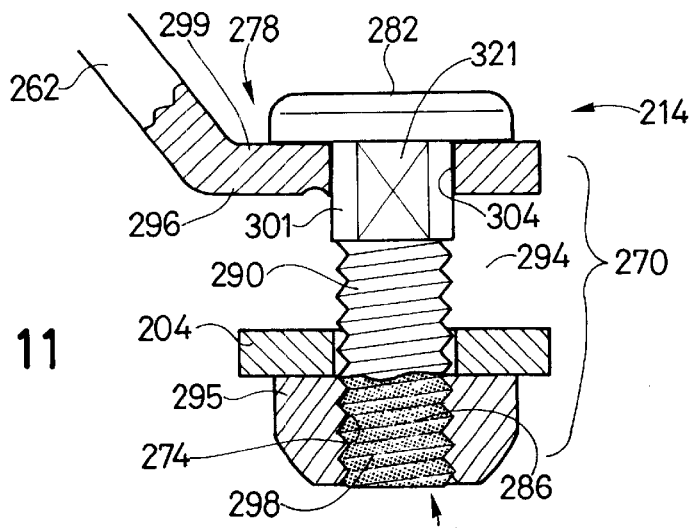
FIG. 11 is a partial cross sectional view of the actuating arm of the derailleur shown in FIG. 9 illustrating the cable connecting apparatus.
Figure 12:
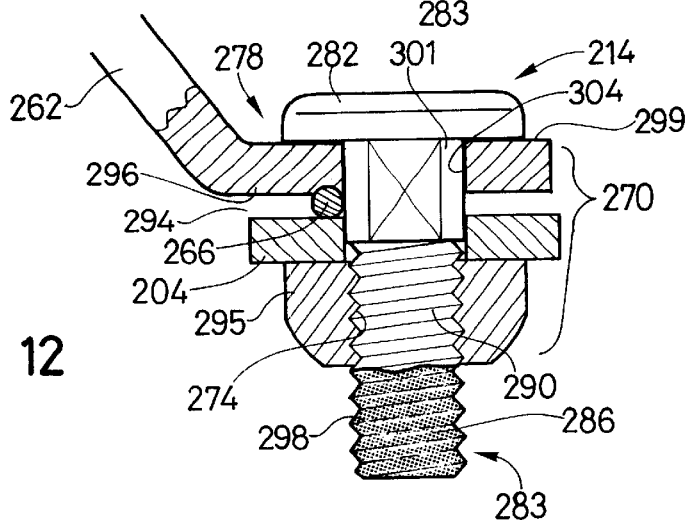
FIG. 12 is a partial cross sectional view of the actuating arm of the derailleur shown in FIG. 9 illustrating the cable connecting apparatus in an assembled state.

FIG. 11 shows cable connecting apparatus 214 in a state suitable for shipment, and FIGS. 9, 10 and 12 show cable connecting apparatus in the assembled state. As shown more particularly in FIGS. 10–12, cable connecting apparatus 214 includes a cable connecting unit 270 having a fastener opening 274, and a fastener in the form of a bolt 278 disposed in fastener opening 274. Bolt 278 includes a head 282 and a shank 283 including a locking portion 286 disposed in fastener opening 274 (FIG. 11) and an exposed threaded portion 290 disposed between head 282 and locking portion 286 so that a space 294 is formed between locking portion 286 and head 282.

Figure 13:
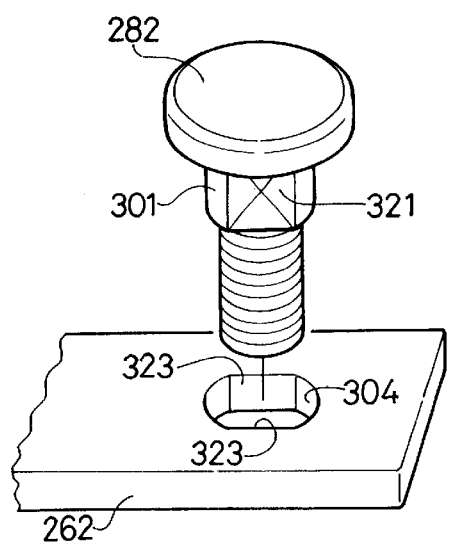
FIG. 13 is an exploded view of the bolt and actuating arm for the derailleur shown in FIG. 9 illustrating structures that nonrotatably secure the bolt to the actuating arm.

In this embodiment, cable connecting unit 270 includes actuating arm 262 and a nut 295 disposed at a first side 296 of actuating arm 262, wherein nut 295 has a threaded inner peripheral surface which forms fastener opening 274 and mates with threaded portion 290 of bolt 278. Bolt 278 includes a collar 301 directly adjacent to head 282, wherein collar 301 is disposed in a collar opening 304 in actuating arm 262 so that head 282 is directly adjacent a second side 299 of actuating arm 262 and space 294 is disposed at the first side of actuating arm 262. Also, as shown in FIG. 13, collar 301 includes diametrically opposed flat rotation inhibiting fastener portions 321 (only one is shown in FIG. 13), and actuating arm 262 includes rotation inhibiting engaging portions in the form of flat portions 323 of collar opening 304 for engaging the flat rotation inhibiting fastener portions 321 so that bolt 278 is nonrotatably fixed to actuating arm 262.

As in the above embodiments, a locking member 298 is disposed at locking portion 286 of bolt 278 between the threaded fastener opening 274 and locking portion 286 for locking bolt 278 to nut 295 and hence to cable connecting unit 270. In this embodiment, nut 295 has a hexagonal shape which allows nut 295 to be engaged by a tool.

When cable 266 is to be affixed to cable connecting apparatus 214, outer casing 267 is placed in tension adjusting barrel 269, cable 266 is placed in space 294, a tool is engaged with nut 295, and nut 295 is rotated to cause nut 295 to move toward first side 296 of actuating arm 262. In this embodiment, a washer 204 is disposed around bolt 278 between locking portion 286 and head 282 (between nut 295 and actuating arm 262) for pressing against cable 266 in the assembled state as shown in FIG. 12.

While the above is a description of various embodiments of the present invention, further modifications may be employed without departing from the spirit and scope of the present invention. For example, the size, shape, location or orientation of the various components may be changed as desired. The cable connecting structures used for the front derailleur may be used in the rear derailleur and vice versa. The functions of one element may be performed by two, and vice versa. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the scope of the invention should not be limited by the specific structures disclosed or the apparent initial focus on a particular structure or feature.

What is claimed is:

1. A cable connecting apparatus for a bicycle component comprising:

an actuating arm for the bicycle component;

a nut disposed at a first side of the actuating arm, wherein the nut forms a fastener opening having a threaded portion and a surface that faces toward a surface of the actuating arm;

a fastener disposed in the fastener opening, wherein the fastener includes:
  a head, disposed at a second side of the actuating arm, wherein the second side is opposite the first side; and
  a shank that is one-piece with the head, wherein the shank includes:
    a locking portion disposed in the fastener opening; and
    a threaded portion that is one-piece with the locking portion and that is disposed between the head and the locking portion so that a space for receiving a cable therein is formed between the locking portion and the head;

a locking member disposed at the locking portion of the fastener for locking the fastener to the actuating arm;

wherein the locking member is sandwiched between an outer peripheral surface of the locking portion and an inner peripheral surface of the fastener opening; and wherein the space is disposed at the first side of the actuating arm so that the surface of the nut is spaced apart from the surface of the actuating arm and so that the threaded portion of the shank can be subsequently screwed into the threaded portion of the fastener opening.

2. The apparatus according to claim 1 wherein the head is disposed directly adjacent to the second side of the actuating arm.

3. The apparatus according to claim 1 wherein the fastener includes a collar disposed between the locking portion and the head.

4. The apparatus according to claim 3 wherein the actuating arm includes a collar opening for receiving the collar therein.

5. The apparatus according to claim 4 wherein the collar is disposed directly adjacent to the head.

6. The apparatus according to claim 1 wherein the fastener opening has a threaded inner peripheral surface, and wherein the locking member is disposed between the locking portion of the fastener and the threaded inner peripheral surface of the fastener opening.

7. The apparatus according to claim 1 wherein the threaded portion of the fastener is exposed.

8. The apparatus according to claim 1 wherein the head has a hexagonal shape.

9. The apparatus according to claim 1 further comprising a washer disposed around the fastener between the locking portion and the head.

10. The apparatus according to claim 1 wherein the fastener includes a rotation inhibiting fastener portion having a rotation inhibiting shape when viewed along a longitudinal axis of the fastener.

11. The apparatus according to claim 10 wherein the actuating arm includes a rotation inhibiting engaging portion engaging with the rotation inhibiting fastener portion.

12. The apparatus according to claim 11 wherein the actuating arm includes a rotation inhibiting opening for receiving the rotation inhibiting fastener portion therein.

13. The apparatus according to claim 12 wherein the rotation inhibiting fastener portion is flat.

14. The apparatus according to claim 12 wherein the fastener includes a collar disposed between the locking portion and the head, and wherein the rotation inhibiting fastener portion is disposed on the collar.

15. The apparatus according to claim 14 wherein the collar is disposed directly adjacent to the head.

* * * * *